US010887861B2

(12) United States Patent
Lou et al.

(10) Patent No.: US 10,887,861 B2
(45) Date of Patent: Jan. 5, 2021

(54) FACILITATING HARMONIZATION OF WIRELESS COMMUNICATION SERVICE DELIVERY

(71) Applicants: AT&T Intellectual Property I, L.P., Atlanta, GA (US); AT&T Mobility II LLC, Atlanta, GA (US)

(72) Inventors: Yuang Lou, Dunwoody, GA (US); Douglas A. Duet, Roswell, GA (US); George O'Quinn Hirvela, Carrollton, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 350 days.

(21) Appl. No.: 14/803,516

(22) Filed: Jul. 20, 2015

(65) Prior Publication Data

US 2017/0026951 A1    Jan. 26, 2017

(51) Int. Cl.
*H04W 64/00* (2009.01)
*H04W 72/04* (2009.01)
(Continued)

(52) U.S. Cl.
CPC .......... *H04W 64/003* (2013.01); *H04L 5/001* (2013.01); *H04L 5/0035* (2013.01);
(Continued)

(58) Field of Classification Search
CPC ............ H04L 5/14; H04W 4/02; H04W 72/04
(Continued)

(56) References Cited

U.S. PATENT DOCUMENTS 5,682,380 A * 10/1997 Park .................... H04W 36/12
                                                                370/331
7,423,602 B2    9/2008 Lockie et al.
(Continued)

FOREIGN PATENT DOCUMENTS

EP    2779731 A1    9/2014
EP    2789187 A2    10/2014
(Continued)

OTHER PUBLICATIONS

Millimeter Wave Cellular Wireless Networks: Potentials and Challenges; Sundeep Rangan, Senior Member, IEEE, Theodore S. Rappaport, Fellow, IEEE, Elza Erkip, Fellow, IEEE Published in: Proceedings of the IEEE ( vol. 102, Issue: 3, Mar. 2014 ).*
(Continued)

*Primary Examiner* — Parth Patel
*Assistant Examiner* — Berhanu D Belete
(74) *Attorney, Agent, or Firm* — Amin, Turocy & Watson, LLP

(57) ABSTRACT

Harmonization of wireless communication service delivery is facilitated. One method comprises receiving, by an anchor node, from a mobile device communicatively coupled to a network, first information indicative of a request for service for the mobile device, wherein the network comprises a first base station (BS) device configured to provide downlink communication between the first BS device and the mobile device, and another BS device configured for uplink communication between the mobile device and the other BS device. The first BS device can be a millimeter wave (mmW) BS device in some embodiments. The method also comprises generating information indicative of a transmission parameter for a type of access to the network device. The transmission parameter can be generated based on various criteria including, but not limited to, whether there is line-
(Continued)

of-sight between the first device and the mobile device, the requested service and/or the availability of network resources.

20 Claims, 10 Drawing Sheets

(51) Int. Cl.
*H04L 5/14* (2006.01)
*H04L 5/00* (2006.01)
(52) U.S. Cl.
CPC .............. *H04L 5/0053* (2013.01); *H04L 5/14* (2013.01); *H04W 72/04* (2013.01)
(58) Field of Classification Search
USPC ......... 455/456.1, 404.2, 456.2, 456.3, 456.5, 455/456.6, 457; 370/310.2, 328
See application file for complete search history.

(56) References Cited

U.S. PATENT DOCUMENTS

| | | | |
|---|---|---|---|
| 8,494,533 B2 | 7/2013 | Boudreau et al. | |
| 8,527,003 B2 | 9/2013 | Gupta et al. | |
| 8,792,896 B2 | 7/2014 | Ahmad et al. | |
| 8,948,111 B2 | 2/2015 | Chen et al. | |
| 8,996,482 B1* | 3/2015 | Singh | G06F 16/27 707/698 |
| 9,246,942 B2* | 1/2016 | Xue | G06F 21/57 |
| 2006/0023683 A1* | 2/2006 | Lee | H04W 36/0011 370/338 |
| 2007/0115899 A1* | 5/2007 | Ovadia | H04W 36/24 370/338 |
| 2009/0080382 A1* | 3/2009 | Chen | H04W 36/0016 370/331 |
| 2010/0113019 A1* | 5/2010 | Jeong | H04W 36/0005 455/435.2 |
| 2010/0232393 A1* | 9/2010 | Shuai | H04W 36/0022 370/331 |
| 2010/0238909 A1* | 9/2010 | Kim | H04W 74/0833 370/336 |
| 2011/0111788 A1* | 5/2011 | Damnjanovic | H04W 52/42 455/522 |
| 2011/0313925 A1* | 12/2011 | Bailey, Jr. | G06Q 40/02 705/44 |
| 2012/0088516 A1 | 4/2012 | Ji et al. | |
| 2012/0094692 A1* | 4/2012 | MacDonald | G01S 5/0252 455/456.1 |
| 2013/0077482 A1 | 3/2013 | Krishna et al. | |
| 2013/0133030 A1* | 5/2013 | Xue | H04L 63/10 726/1 |
| 2013/0281089 A1 | 10/2013 | Chandrasekhar et al. | |
| 2013/0301439 A1 | 11/2013 | Heo et al. | |
| 2013/0322235 A1 | 12/2013 | Khoryaev et al. | |
| 2014/0031006 A1 | 1/2014 | Moore et al. | |
| 2014/0185435 A1* | 7/2014 | Park | H04W 36/32 370/229 |
| 2014/0242991 A1 | 8/2014 | Yanover et al. | |
| 2014/0287743 A1 | 9/2014 | Yeh et al. | |
| 2014/0329520 A1* | 11/2014 | Militano | H04W 24/08 455/422.1 |
| 2014/0355501 A1* | 12/2014 | Carmon | H04W 36/16 370/311 |
| 2015/0043390 A1 | 2/2015 | Wang et al. | |
| 2015/0063295 A1 | 3/2015 | Himayat et al. | |
| 2015/0071135 A1* | 3/2015 | Kapoor | H04W 36/06 370/281 |
| 2015/0358129 A1* | 12/2015 | Ryu | H04L 5/0023 455/438 |
| 2015/0365814 A1* | 12/2015 | El Ayach | H04W 48/16 370/254 |
| 2015/0373593 A1* | 12/2015 | Ryu | H04W 36/0083 370/332 |
| 2015/0382268 A1* | 12/2015 | Hampel | H04W 36/24 455/436 |
| 2016/0036541 A1* | 2/2016 | Siomina | H04W 24/10 455/422.1 |
| 2016/0044559 A1* | 2/2016 | Xu | H04W 36/0055 370/331 |
| 2016/0057708 A1* | 2/2016 | Siomina | H04W 52/243 455/452.2 |
| 2017/0171826 A1* | 6/2017 | Damnjanovic | H04W 52/146 |

FOREIGN PATENT DOCUMENTS

| | | |
|---|---|---|
| EP | 2790430 A1 | 10/2014 |
| EP | 2833670 A1 | 2/2015 |
| EP | 2836011 A1 | 2/2015 |
| GB | 2479376 A | 10/2011 |
| WO | 2013123644 A1 | 8/2013 |
| WO | 2013170169 A2 | 11/2013 |
| WO | 2014007699 A1 | 1/2014 |
| WO | 2014074894 A1 | 5/2014 |
| WO | 2014124164 A1 | 8/2014 |
| WO | 2014162172 A1 | 10/2014 |
| WO | 2014172306 A2 | 10/2014 |
| WO | 2014183816 A1 | 11/2014 |
| WO | 2014186062 A1 | 11/2014 |

OTHER PUBLICATIONS

Hussain, "An Innovative RAN Architecture for Emerging Heterogeneous Networks: The Road to the 5G Era", 2014, 165 Pages.
Barbieri, et al., "Coordinated Downlink Multi-Point Communications in Heterogeneous Cellular Networks", Corporate R&D, Qualcomm Inc., San Diego, 10 Pages. Retrieved on Apr. 13, 2015.
Monserrat, et al., "METIS Research Advances Towards the 5G Mobile and Wireless System Definition," EURASIP Journal on Wireless Communications and Networking, 2015, Springer, 16 Pages.
"HetNet: The Future of Mobile Networking", Huawei Solutions, Huawei Technologies Co., Ltd., 4 Pages. Retrieved on Apr. 9, 2015.
Haustein, et al.,"Harvesting Millimeter Wave Spectrum for 5G Ultra High Wireless Capacity Challenges and Opportunities", Millimetre-Wave Evolution for Backhaul and Access (MiWEBA) at Combined Exhibition of Advanced Technologies (CEATEC), Oct. 8, 2014, 46 Pages.
Estevez, et al., "Interference Analysis and Mitigation for Heterogeneous Cellular Networks", Dec. 2014, 178 Pages, Georgia Institute of Technology.
Boccardi, et al., "Why to Decouple the Uplink and Downlink in Cellular Networks and How to Do It", Mar. 23, 2015, 14 Pages.

* cited by examiner

FACILITATING HARMONIZATION OF WIRELESS COMMUNICATION SERVICE DELIVERY

TECHNICAL FIELD

The subject disclosure relates generally to wireless communications, and, more particularly, to systems, apparatuses and methods of facilitating harmonization of wireless communication service delivery.

BACKGROUND

Mobile communication services are fast expanding in service content delivery and in service coverage scale. However, with such expansion, the wireless communication industry has a commensurate need for spectrum. Currently, the wireless communication industry is evaluating the use of spectrum in the 600 megahertz (MHz) to 700 MHz range. Millimeter wave (mmW) communication, which is typically 30 gigahertz (GHz) to 300 GHz where wavelengths are 10 millimeters (mm) to 1 mm, is also being evaluated. However, the challenges of utilizing mmW communication for mobile communications are numerous. For example, mmW communication typically thrives in line-of-sight communication scenarios. Further, while indoor environments more readily facilitate mmW communication, outdoor environments can be challenging.

DETAILED DESCRIPTION

Figure 1:
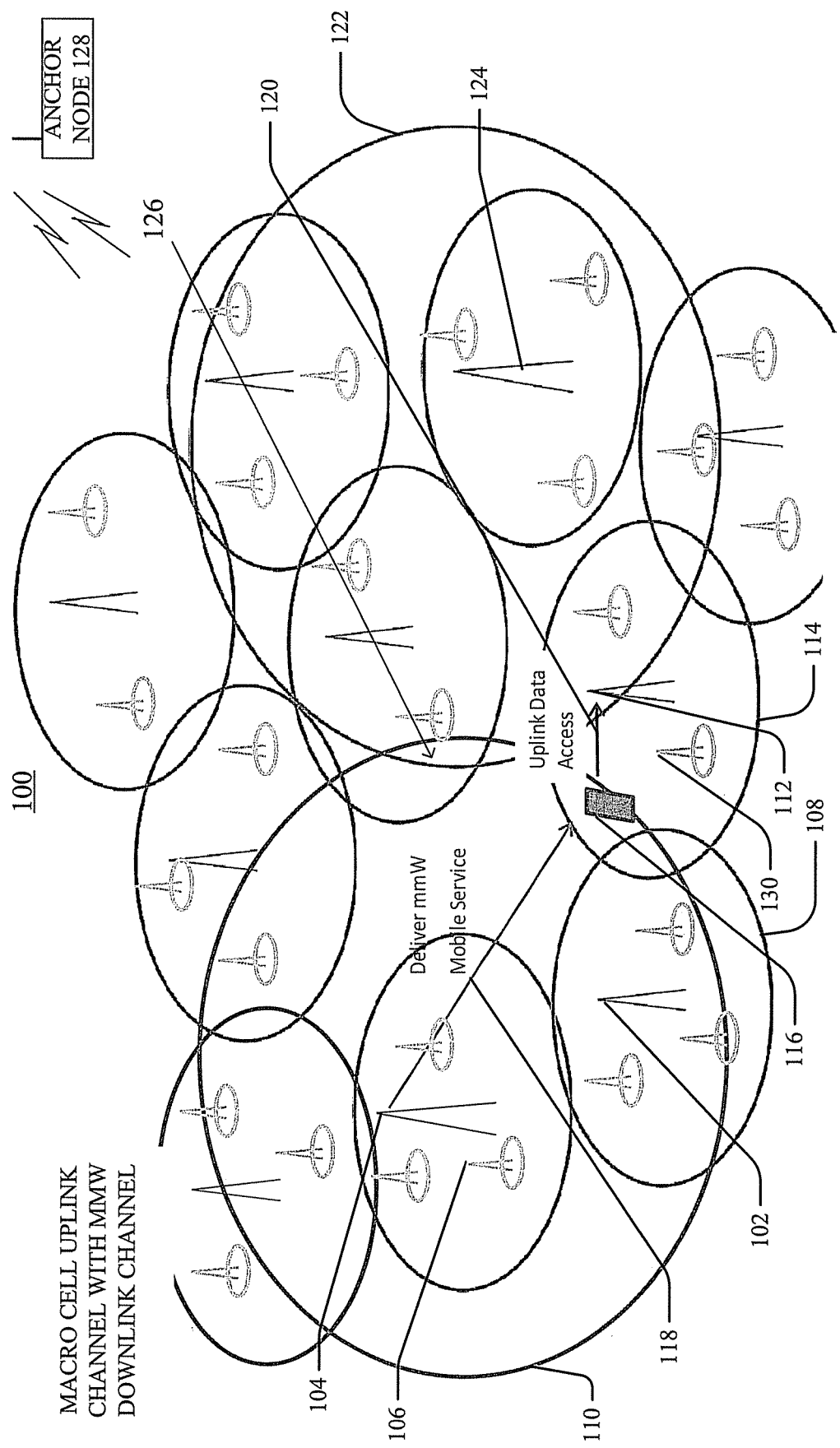
FIG. 1 illustrates an example schematic diagram of a system that facilitates wireless communication service delivery employing a layered network architecture with macro cell base station (BS) device uplink channel and mmW BS device downlink channel in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

Mobile communication services are fast expanding in service content delivery and also in service coverage scale. For the service content delivery, traditional mobile services in the past were focused on cellular voice communications. However, current mobile services have emphasized internet protocol (IP)-based and IP multimedia services (IMS)-based long term evolution (LTE) data coverage. Future mobile coverage will offer user controlled streaming multimedia services including audio and broadcast and multicast video content delivery. Mobile service evolution may re-shape the radio business market and attract more user traffic with boosted consumer demands as more radio frequency (RF) spectrum is regularly made available to mobile internet developments from 600 megahertz (MHz) ultra high frequency (UHF) to mmW spectrum (e.g., from 30 GHz to 300 GHz). However, the challenges of utilizing mmW communication for mobile communications are numerous. For example, mmW communication typically thrives in line-of-sight communication scenarios. Further, while indoor environments facilitate mmW communication, providing mmW communication in outdoor environments can be challenging. Conventionally, the mmW band has been either used in high power service delivery for one way satellite broadcasting or, at another extreme, used in low power indoor communications over short distances due to high RF propagation loss.

One or more aspects of the embodiments described herein can improve utilization of the mmW spectrum through network coordination. In one embodiment, a method is provided. The method comprises receiving, by an anchor node comprising a processor, from a mobile device communicatively coupled to a network device of a network, first information indicative of a request for service for the mobile device, wherein the network comprises a first base station device configured to provide downlink communication over a downlink channel between the first base station device and the mobile device, and another base station device configured for uplink communication over an uplink channel between the mobile device and the other base station device, wherein the other base station device is associated with a first cell site area of service and the first base station device is associated with a second cell site area of service, and wherein the uplink channel and the downlink channel are separate channels facilitating frequency division duplex communication. The method also comprises generating, by the anchor node, information indicative of a transmission parameter for a type of access by the mobile device.

In another embodiment, a computer-readable storage device is provided. The computer-readable storage device stores executable instructions that, in response to execution, cause a system comprising a processor to perform operations. The operations comprise generating first information associated with a first resource assignment of a first base station device to a mobile device for downlink channel communication; and generating second information associated with a second resource assignment of a communication channel for communication between the mobile device and a second mobile device of mobile devices forming a mesh network.

In yet another embodiment, an apparatus is provided. The apparatus comprises: a processor; and a memory that stores executable instructions that, when executed by the processor, facilitate performance of operations. The operations can include: receiving information indicative of a network service request for a service for a mobile device; and determining resource assignment information to provide the service to the mobile device, wherein the resource assignment information comprises assignment of a first base station device for a downlink channel and a second base station device for an uplink channel, wherein the first base station device and the second base station device comprise overlapping cell site areas and form a multiple layer network architecture.

One or more of the embodiments can provide a network configuration that is flexible and can employ LTE orthogonal frequency division multiple access (OFDMA), 5G radio implementation and/or can dynamically track market traffic demands. Spectrum utilization and/or network operation can be improved by making mmW frequency bands available to mobile streaming services in wider area coverages and/or by addressing special device demands for an instantaneous high rate delivery of information. Beyond the wide area coverage in outdoor environments, the mmW bands can also be used in indoor high speed communications. In various embodiments, an mmW BS device can also be assigned to provide communication for indoor and/or small cell areas, and frequency reuse can be employed.

Network coordination, which can be provided in one or more embodiments, via an anchor node, can improve operations of heterogeneous, small cell base station offloading and/or facilitate session continuity in mobile streaming services. Further, one or more embodiments can provide lower cost network architectures relative to traditional networks since the mmW BS device downlink channel can provide downlink transmission over a larger area (relative to the downlink channel coverage area of macro cell BS device downlink channels, for example).

Although mmW is typical defined at 30 GHz to 300 GHz where wavelengths are 10 mm to 1 mm, it is noted that mmW frequencies described herein also include and/or envisage coverage of the microwave region of frequencies. The microwave region is defined as 1 GHz to 100 GHz. Communication over all such frequencies can be facilitated employing one or more of the embodiments described herein.

Turning now to the drawings, FIG. 1 illustrates an example schematic diagram of a system that facilitates wireless communication service delivery employing a layered network architecture with macro cell BS device uplink channel and mmW BS device downlink channel in accordance with one or more embodiments described herein.

System 100 can improve the utilization of the mmW spectrum through network coordination and thereby enhance provisioning of mobile services. The service architecture of system 100 follows the state of art in radio technology but targets the coordination of service delivery over an entire licensed spectrum of a service provider. For example, in the network architecture shown in system 100, the services and the network in individual licensed RF bands need not be independent of each other but, rather, can be coordinated in order to optimize or improve the overall mobile radio service delivery. This proposed network architecture can be described as a harmonized model (in some embodiments, with the anchor node 128 being a macro cellular system component) implemented as a service anchor that initiates mobile access and manages the service traffic flows among the anchor subnet access, small cell BS device offloading, and super mmW BS device subnet access. The small cell BS offloading subsystem can employ either the same RF spectrum as the macro cellular subsystem or unlicensed spectrum. A key function of the network of system 100 is to attract and/or offload local mobile device access traffic from the macro cell BS device so that the overall data capacity of the mobile internet network can be boosted. One or more embodiments of the system 100 can focus on an mmW BS device super cell site area of service and infrastructure to make its cell coverage wider than the present indoor systems and as wide as or greater than the macro cell BS device cell site of service while still providing support for the mobile device uplink control.

System 100 of FIG. 1 shows a network architecture that can provide or facilitate service coverage of harmonized radio networks with a 3-layered mobile service delivery using a macro cell BS device for the uplink channel. System 100 includes a network having multiple different types of BS devices providing different cell site areas of coverage, one or more mobile devices and an anchor node that can assign resources for mobile device services provisioning employing use of downlink and/or uplink channel facilitated via the one or more BS devices. The embodiment shown is one example of a configuration of BS devices and cell site areas of services. In other embodiments, any number of different arrangements or number or types of BS devices and/or cell site arrangement to one another can be provided and are envisaged. The cell site areas of service and BS devices can provide a network architecture that has multiple layers for various different permutations of downlink channel and/or uplink channel communication options thereby improving service provisioning to the mobile device 116 and more efficiently utilizing network resources.

In the embodiment shown, system 100 includes one or more mmW BS devices (e.g., mmW BS devices 104, 124), one or more macro cell BS devices (e.g., macro cell BS devices 102, 112), at least one anchor node (e.g., anchor node 128) and/or one or more mobile devices (e.g., mobile device 116). In various embodiments, one or more of the mmW BS devices 104, 124, macro cell BS devices 102, 112, anchor node 128 and/or mobile device 116 can be electrically and/or communicatively coupled to one another to perform one or more functions of the system 100. While the anchor node 128 is shown as a separate component from the macro cell BS devices of system 100, in some embodiments, the anchor node 128 can be included as part of, or electrically or communicatively coupled to, one or more of the macro cell BS devices.

Each of the BS devices of the network shown in system 100 is associated with a different cell site area of service. In the embodiment shown, the system 100 includes mmW BS devices 104, 124, which are associated with cell site areas of service 110, 122; and macro cell BS devices 102, 112, which are associated with cell site areas of service 108, 114. In some embodiments, the system 100 is also associated with small cell BS devices (e.g., small cell BS device 130), which is associated with a small cell site area of service.

As shown, the different cell site areas of service range in size and, for example, for BS devices transmitting at a high (or higher) power level, the cell site area of service can be larger than the cell site area of service for a BS transmitting at a low (or lower) power level. In some embodiments, higher equivalent/effective isotropically radiated power (EIRP) BS transmission on the downlink channel can be performed at the mmW BS device (e.g., mmW BS device 104) to exceed the typical cell site area (or radius) of service given the inter cell-site distance so as to result in a super cell site area of service. In the embodiment shown, cell site areas of service 110, 122 are larger than cell site areas of service 108, 114 because the power level associated with the downlink channel from the mmW BS devices 110, 124 is greater than the power level associated with the uplink channel from the mobile device 116 to the macro cell BS device (e.g., macro cell BS device 112). This design and/or architecture can address and/or minimize the effect of the limitations of outdoor use typically associated with mmW BS device communication.

In some embodiments, each of mmW BS devices 104, 124, can be configured to provide downlink channel communication. For example, as shown in FIG. 1, mmW BS device 104 can be configured to provide communication to mobile device 116 via the downlink channel 118. Because the mmW BS device 104 can use higher power for transmissions than the mobile device 116, the downlink communication channel 118 (which is provided by the mmW BS device 104) has greater power than the uplink channel 120 from the mobile device 116 to the macro cell BS device 112. Accordingly, the radius or area of the cell site area 110 for the mmW BS device 104 is greater than the cell site area 114 for the macro cell BS device 112. As shown, the system 100 includes a layered architecture of numerous different overlapping cell site areas associated with different levels of BS devices (e.g., mmW BS devices, macro cell BS devices and/or small cell BS devices). In one or more embodiments, the frequency band of the downlink channel (e.g., downlink channel 118) can be distinct from the frequency band of the uplink channel (e.g., uplink channel 120) and can be facilitated via FDD communications.

The mobile device 116 can be configured to receive and/or transmit information on different frequency bands, including, but not limited to, mmW BS device communication frequency bands. For example, mobile device 116 can be a multi-RF-band mobile device. With wider area mmW BS device service delivery, traffic flow between mmW BS devices and multi-RF-band mobile devices can be separated into downlink channel delivery and uplink channel control—the downlink channel delivery can be provided via one mmW RF band network and the uplink channel delivery can be provided via a second RF band network.

In some embodiments, the mmW BS device delivers the mobile downlink contents only (shown as downlink channel 118 in FIG. 1, for example). The mobile device uplink channel control utilizes the uplink channel spectrum of the nearby small cell BS device or macro cell BS device (shown as uplink channel 120 in FIG. 1). The mmW BS device 104 downlink channel 118 coverage could be near line-of-sight (LOS) and can be adaptive in transmit power range. In some embodiments, the anchor node 128 can determine the transmit power range and/or transmit power level based on different criteria, including, but not limited to, the location of the mobile device 116 relative to the location of the mmW BS device 104.

In some embodiments, the downlink channel 118 for the mmW BS device 104 can be OFDMA-based so that the downlink channel 118 matches the current LTE downlink channel configuration. Based on the OFDMA configuration, the coverage of the mmW BS device 104 cell site area of service can be omnidirectionally delivered to provide mobile broadcast or multicast streaming services. The configuration can be dynamic in nature, depending on market demands, and therefore can change from time to time.

In some embodiments, the coverage of the mmW BS device 104 cell site area of service coverage can be directionally based on OFDMA beamforming and thus can be configured to adjust to point to or target communications at any mobile device to provide special access for an instantaneous high rate data delivery. Downloading a large file to a mobile device instantly is one example. This special spot delivery can be coordinated by the anchor node 128.

The anchor node 128 can evaluate different factors and generate information indicative of one or more transmission parameters (e.g., type of BS device, identity of BS device, frequency band for downlink channel, frequency band for uplink channel, power level for downlink channel, power level for uplink channel) for a type of access to the network device by the mobile device. By way of example, but not limitation, the anchor node 128 can evaluate three layers of architecture and coordinate resources across such layers so that the overall network capacity can be improved and/or maximized and service delivery can therefore be improved and/or optimized. In various embodiments, the anchor node 128 can be configured to evaluate one or more aspects of the services requested by the mobile device 116, topography of the location of the mobile device 116, whether there is line of sight between the mmW BS device and the mobile device 116, availability of particular BS devices and/or cell site areas of service (e.g., traffic loading, capacity, etc.) and/or any number of other considerations. The anchor node 128 can generate and/or transmit information indicative of one or more resource assignments (e.g., BS device, uplink or downlink channel assignment, frequency band assignment) enabling use of the mmW BS device communication to cover outdoor environment scenarios.

In some embodiments, the anchor node 128 can have a two-part inquiry. First, the anchor node 128 can determine whether there is line of sight between the mmW BS device and the mobile device 116. If the anchor node 128 determines there is line of sight between the mmW BS device and the mobile device 116, the anchor node 128 can determine whether there are resources available by the mmW BS that has line of sight with the mobile device 116. If that particular mmW BS has resources available, the anchor node 128 can schedule the downlink communication to commence (or, in some cases, continue) between the mmW BS and the mobile device 116.

For the embodiments described herein, the anchor node 128 can evaluate one or more (or all) possible solutions and/or combinations of resource assignments that can be managed within the system 100. The anchor node 128 can coordinate the various resources across different types of BS devices and/or for different frequencies available. The anchor node 128 can increase the likelihood of better coverage and efficient utilization of frequency because the anchor node 128 can serve as a centralized controller. In these embodiments, the anchor node 128 can facilitate a system that has separate uplink and downlink but novel frequency division duplex (FDD) channels and/or coordination among different frequency bands and/or different devices. The separate uplink and downlink FDD communication described in one or more embodiments herein can include: uplink and downlink FDD access that does not need to be balanced in power and/or in RF reach (and therefore the power and/or the RF reach for the uplink and downlink can differ from one another and/or from time to time); downlink and uplink FDD pairs that are not assigned in a fixed pattern (and therefore the downlink and uplink FDD pair can change from time to time) and/or can be dynamically assigned; and the FDD can provide flexibility to the mobile communications and/or improve mobile service delivery. Data to and/or from a mobile device can be offloaded to a small cell BS device and/or focused high rate delivery case can be provided to a mobile device from an mmW BS device.

In the embodiment shown in FIG. 1, since the system 100 employing mmW BS devices 104, 124, line of sight between the mmW BS device (e.g., mmW BS device 104) and the mobile device 116 (or other device to which the mmW BS device 104 is transmitting on the downlink channel 118) can be evaluated by the anchor node 128. Accordingly, as the mobile device 116 moves from one location to another location within the network of system 100, the anchor node 128 can determine whether line of sight between the mmW BS device (e.g., mmW BS device 104) and the mobile device 116 exists and/or strength of such line of sight communication. For example, when the mobile device 116 is moving from one location to another location on a road, line of sight typically exists between the mmW BS device 104 and the mobile device 116. However, when the mobile device 116 is in a residential area, line of sight between the mmW BS device 104 and the mobile device 116 can degrade or be absent altogether. While line of sight is present, the anchor node 128 can assign the mmW BS device 104 to provide a downlink communication channel 118 to the mobile device 116. If line of sight is not present and/or line of sight communication has degraded to below a defined level, in lieu of assigning the mmW BS device 104 for the downlink channel 118, the anchor node 128 can assign the macro cell BS device 112 to provide the downlink channel between the macro cell BS device 112 and the mobile device 116. In this embodiment, the system 100 provides maximum flexibility for assignment of resources. As shown, the anchor node 128 can assign the macro cell BS device 112 to facilitate uplink channel connectivity from the mobile device 116.

In some embodiments, in lieu of or in addition to evaluating line of sight between the mmW BS device 104 and the mobile device 116, the anchor node 128 can determine the topography of the location of the mobile device 116. If the topography is amenable to a downlink channel 118 between the mmW BS device 104 and the mobile device 116, the anchor node 128 can establish the downlink channel 118.

In another embodiment, the anchor node 128 can evaluate the type of service requested by the mobile device 116 to determine which BS device to assign for the downlink channel to the mobile device 116. For example, if the mobile device 116 requests services that are tolerant of service interruption (e.g., data), the anchor node 128 can assign the mmW BS device 104 to provide the downlink channel 118 to the mobile device 116 and the service can be provided via the downlink channel 118. However, in embodiments in which the service requested is intolerant of service disruption and/or very stringent quality of service (QoS) requirements must be met, the anchor node 128 can assign the macro cell BS device 112 to provide the downlink channel. Additionally, due to coordination by the anchor node 128, dynamic mobile streaming broadcast and/or special spot service deliveries can both be integrated into the OFDMA architecture.

As such, the anchor node 128 can serve as a manager/network coordinator that assigns resources to address and/or avoid and/or reduce likelihood of encountering the drawbacks of the mmW BS device limitations. The anchor node 128 can manage the network such that when the mobile device 116 initiates and/or starts a communication session, the anchor node 128 tracks the location of the mobile device 116 and can assign (over time) one or more different BS devices and/or radio frequencies to the mobile device 116 connection as the mobile device 116 moves from one location to another location. As such, the anchor node 128 can dynamically assess the location of the mobile device 116 and assign a mobile device 116 a different frequency and/or a different cell from time to time as the mobile device 116 moves about from location to location while enabling the communication session to still continue (and/or continue in lieu of conditions in which the communication session would have been disconnected had the anchor node 128 not assigned to new resources to the mobile device 116).

In some embodiments, the anchor node 128 can determine the location of the mobile device 116 within a particular cell site area of service. If the mobile device 116 is near a boundary of a cell site area of service, the anchor node 128 can assign a BS device that covers the cell site area of service. In some embodiments, if the mobile device 116 is in an overlapping area of two or more cell site areas of service for two or more mmW BS devices 104, 124, the anchor node 128 can assign macro cell BS device 112 for the downlink channel in lieu of assigning the mmW BS device 104 or the mmW BS device 124.

Accordingly, the anchor node 128 can monitor traffic offloading to the network (e.g., macro cell BS device) and/or to the small cell BS device and/or can direct the resources to facilitate mobile device 116 communication session continuity of different services (e.g., audio/video streaming services) between the network and the macro cell BS device (e.g., LTE network access point). Beyond increased network data capacity, one or more embodiments can improve the user quality of experience (QoE) through the continuity of streaming services.

As described, communication within the network composed of the different BS devices can be facilitated via downlink channels and uplink channels in various different configurations. Accordingly, the anchor node 128 can allocate one or more different BS s and/or downlink channel frequencies or uplink channel frequencies for communication to and/or from the mobile device.

In one embodiment, the anchor node 128 can receive information indicative of a request for a service (e.g., an IMS service, a voice call or the like) and/or a request for network access for the mobile device 116. The anchor node 128 can receive the request from the mobile device 116 and/or any other device in the network shown in system 100. The anchor node 128 can assign a downlink channel to the mobile device 116 from either the mmW BS device 104 and/or from the macro cell BS device 112 (if the mobile device is located in overlapping region 126 between two cell site areas for mmW BS device 104 and mmW BS device 124). The assignment can be based on the location of the mobile device 116 and/or whether there is line of sight between the mobile device 116 and the mmW BS device 104.

Based on the flexible downlink assignment, the mmW BS device 104 can support macro cell coverage where the non line of sight locations can be covered by reassigning the BS devices providing FDD downlink channels and/or by reassigning frequency. Based on the flexible uplink assignment, the mobile device 116 access can be determined by the coverage area of a BS device local to the mobile device 116 (e.g., by a small cell BS device local to the mobile device 116, for example). For the uplink assignment and/or for the downlink assignment, different RF bands can be selected from time to time. The selection of the different RF bands can be based on any number of criteria including, but not limited to, the type of application/service to be executed by the mobile device, whether there is line of sight at the particular location of the mobile device at a particular time, the resources available for the RF band, the amount of use of the RF band at any particular time or the like.

Employing the capable and flexible function of the anchor node 128, the proposed separated downlink and uplink FDD scheme can increase network capacity by largely increased FDD pairing opportunities in a dynamic fashion without increasing the RF spectrum allocation.

Figure 2:
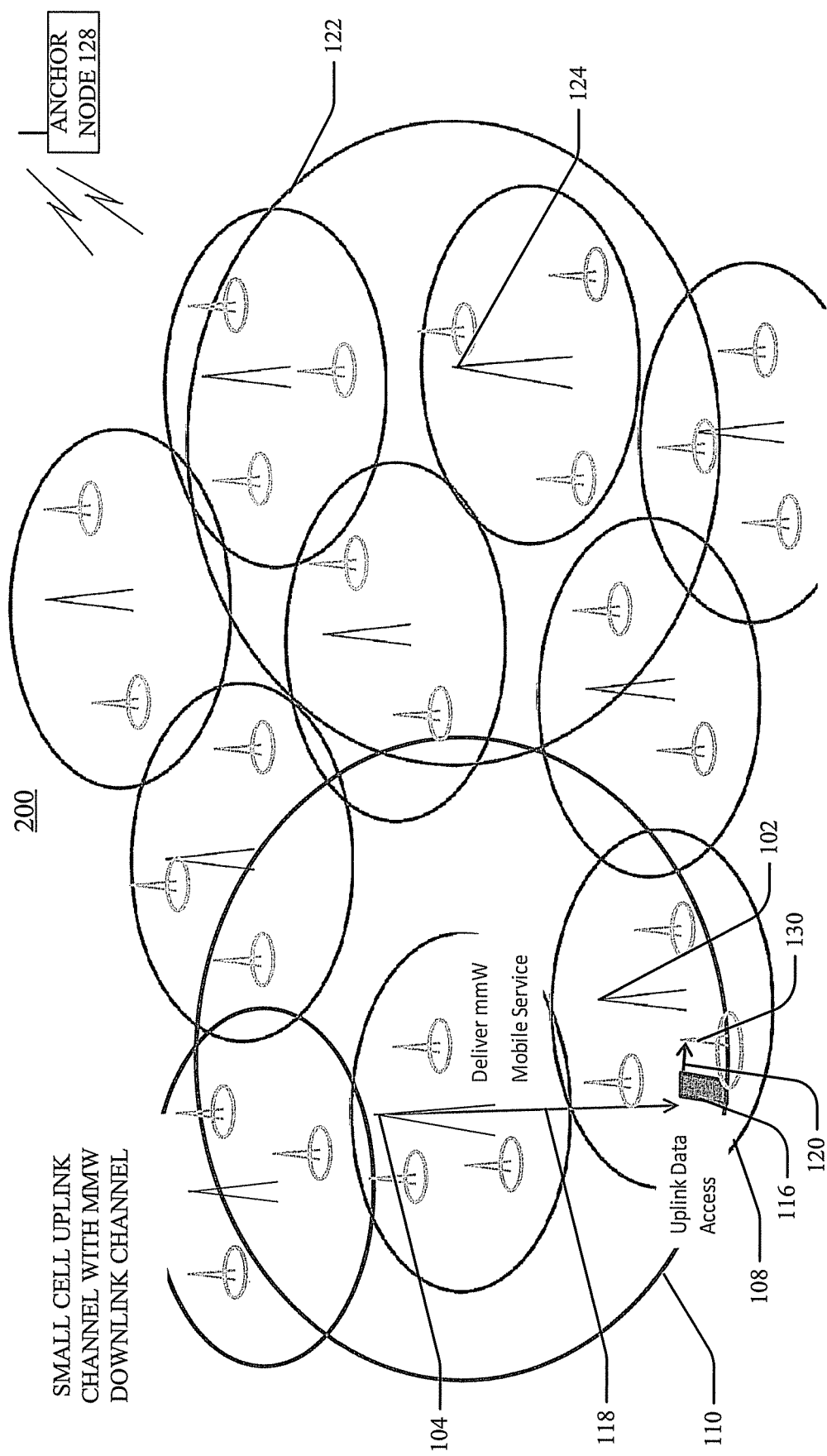
FIG. 2 illustrates an example schematic diagram of another system that facilitates wireless communication service delivery employing a layered network architecture with small cell BS device uplink channel and mmW BS device downlink channel in accordance with one or more embodiments described herein.

FIG. 2 illustrates an example schematic diagram of another system that facilitates wireless communication service delivery employing a layered network architecture with small cell BS device uplink channel and mmW BS device downlink channel in accordance with one or more embodiments described herein. Repetitive description of like elements employed in other embodiments described herein is omitted for sake of brevity. System 200 of FIG. 2 shows a network architecture that can provide or facilitate service coverage of harmonized radio networks with a 3-layered mobile service delivery using a small cell (e.g., femto cell) BS device for the uplink channel. The system 200 includes one or more of the structure and/or functionality of one or more of the system 100 shown and/or described with reference to FIG. 1 (and vice versa).

As shown in FIG. 2, in this embodiment, the anchor node 128 can assign resources to the mobile device 116 such that the downlink channel 118 is assigned from the mmW BS 104 to the mobile device 116 and the uplink channel 120 is assigned from the mobile device 116 to the small cell BS device 102 (instead of the uplink channel 120 being assigned from the mobile device to the macro cell BS device 112). Accordingly, numerous different resources can be allocated employing the anchor node.

Figure 3:
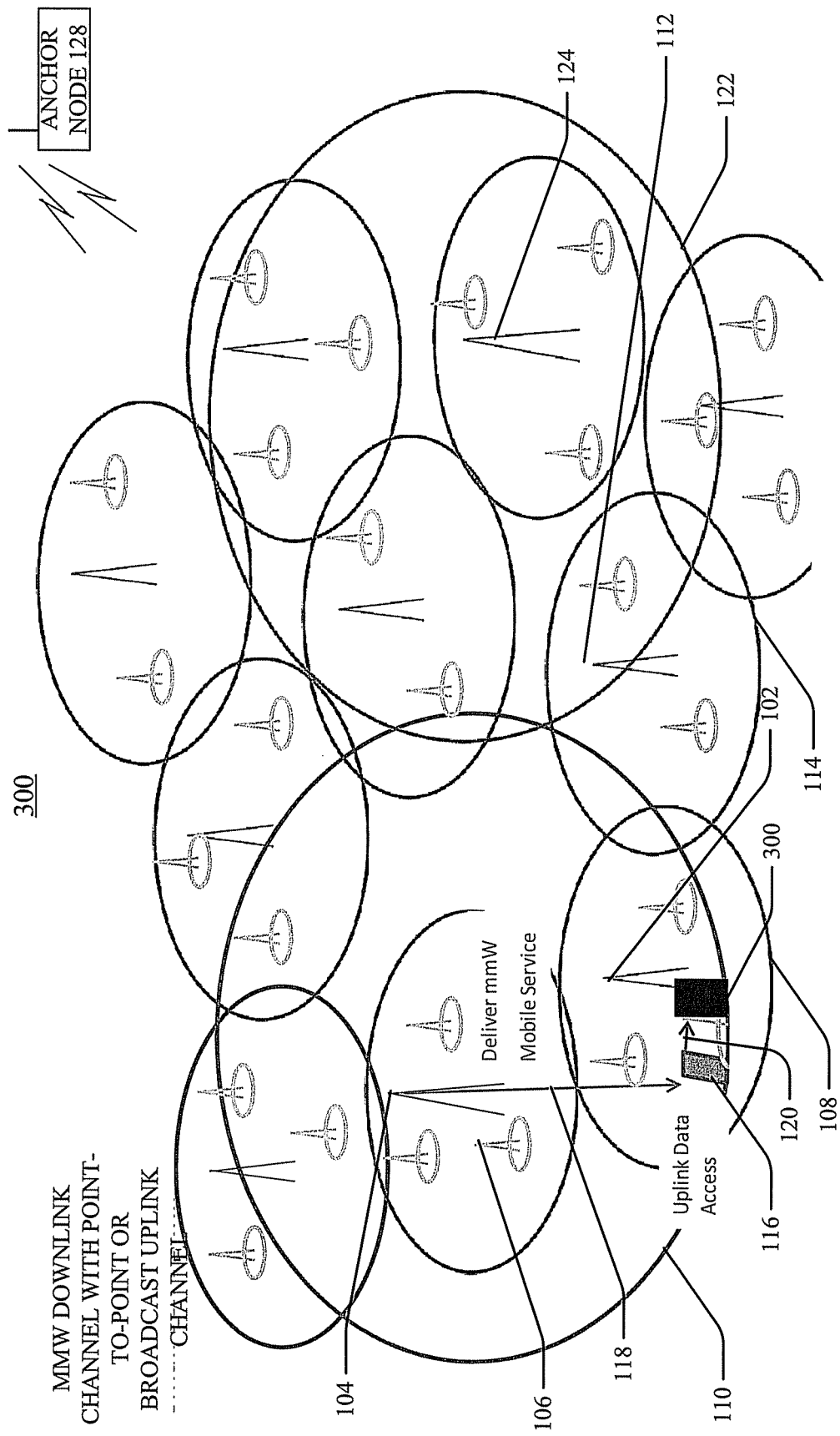
FIG. 3 illustrates an example schematic diagram of another system that facilitates wireless communication service delivery employing a layered network architecture with point-to-point or broadcast uplink channel and mmW BS device downlink channel in accordance with one or more embodiments described herein.

FIG. 3 illustrates an example schematic diagram of another system that facilitates wireless communication service delivery employing a layered network architecture with point-to-point or broadcast uplink channel and mmW BS device downlink channel in accordance with one or more embodiments described herein. Repetitive description of like elements employed in other embodiments described herein is omitted for sake of brevity. The system 300 includes one or more of the structure and/or functionality of one or more of the systems 100 and/or 200 shown and/or described with reference to FIGS. 1 and/or 2, respectively (and vice versa).

While FIGS. 1 and 2 illustrate an mmW BS device 104 for a downlink channel and respective macro cell BS device 112 and small cell BS device 130, FIG. 3 illustrates an embodiment in which the anchor node 128 can assign resources to the mobile device 116 such that the downlink channel 118 is assigned from the mmW BS 104 to the mobile device 116 and the mobile device 116 receives an assignment to transmit to another mobile device (e.g., mobile device 300 shown in FIG. 3). For example, mobile device 116 and mobile device 300 can be mobile devices included in or making up a mesh network of mobile devices. Point-to-point or broadcast communication can be provided from the mobile device 116. For example, in some embodiments, the mobile device 116 can transmit communication from the mobile device 116 to the mobile device 300. In some embodiments, the mobile device 116 can broadcast communication from the mobile device 116. In some embodiments, the mobile device 300 can receive the broadcast communication.

In some embodiments, the communication transmitted from, or in some embodiments, broadcast from, the mobile device 116 can be information intended for the mobile device 300 such that the anchor node 128 can assign resources for mobile device 300 in which the downlink channel for the mobile device 300 is composed of a first downlink channel 118 from the mmW BS device 104 to the mobile device 116 and a second downlink channel from the mobile device 116 to mobile device 300 (channel 120 could be a downlink channel in this embodiment that provides information from mmW BS device 104 to mobile device 300 through mobile device 116, which can forward received information from mobile device 116). Accordingly, in some embodiments, the information can be sent from the mmW BS device 104 to the mobile device 116 and from the mobile device 116 to a second mobile device (e.g., mobile device 300) in a mesh (peer-to-peer) network as opposed to the mmW BS device 104 sending information on a downlink channel 118 directly from the mmW BS device 104 to the mobile device 300. This embodiment can be advantageous in cases in which the mobile device 116 is a mobile device configured to receive communication on frequency bands on which the mmW BS device 104 can transmit while mobile device 300 may not be able to receive such transmissions from mmW BS device 104. Accordingly, the service or information can be provided to mobile device 300 via direct communication from the mobile device 116 instead of direct communication from the mmW BS device 104.

In some embodiments, the communication transmitted from, or in some embodiments, broadcast from, the mobile device 116 can be information intended for the mobile device 300 such that the anchor node 128 can assign resources for mobile device 300 in which the downlink channel for the mobile device 116 is composed of downlink channel 118 from the mmW BS device 104 to the mobile device 116 and an uplink channel for mobile device 116 that is provided from mobile device 116 to mobile device 300 (channel 120 could be a uplink channel in this embodiment that provides information from the mobile device 116 to mobile device 300).

Accordingly, through the use of the anchor node 128, one or more embodiments can extend RF coverage via the mmW BS device from indoor coverage to outdoor coverage. Also, as the mobile device 116 moves into different RF environments, the anchor node 128 can manage the mobile device 116 communication session to maintain the communication session (or increase the likelihood of maintaining the communication session). Management by the anchor node 128 can include consideration such as, but not limited to, topography, whether there is line of sight, what different frequencies and/or cell site areas of service are available or the like.

Figure 4:
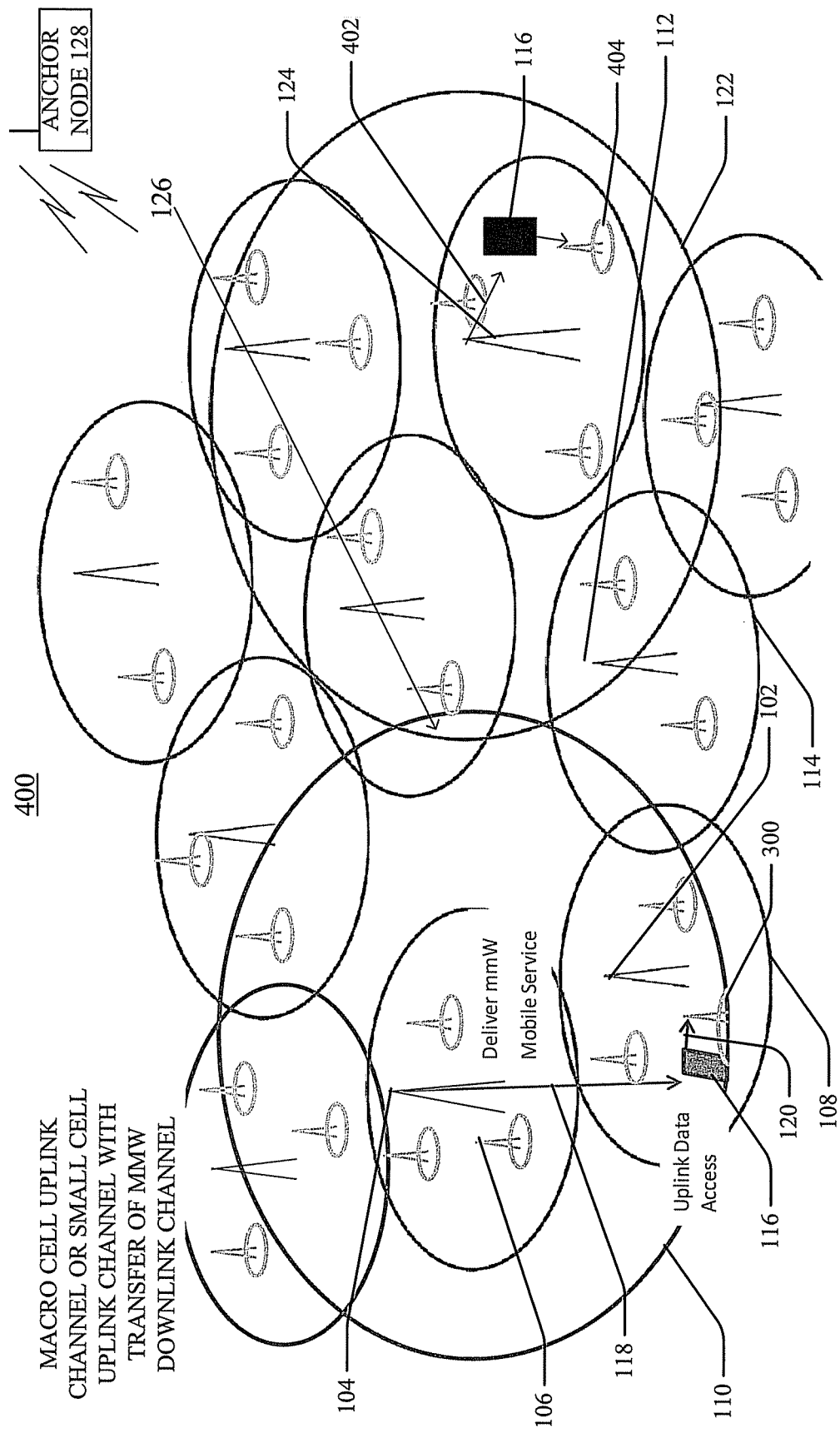
FIG. 4 illustrates an example schematic diagram of another system that facilitates wireless communication service delivery employing a layered network architecture with macro cell BS device uplink channel or small cell BS device uplink channel and transfer from mmW BS device to another mmW BS device in accordance with one or more embodiments described herein.

FIG. 4 illustrates an example schematic diagram of another system that facilitates wireless communication service delivery employing a layered network architecture with macro cell BS device uplink channel or small cell BS device uplink channel and transfer of mmW BS device in accordance with one or more embodiments described herein. Repetitive description of like elements employed in other embodiments described herein is omitted for sake of brevity. The system 400 includes one or more of the structure and/or functionality of one or more of the systems 100, 200 and/or 300 shown and/or described with reference to FIGS. 1, 2 and/or 3, respectively (and vice versa).

With reference to FIG. 4, in another embodiment, because the mmW BS devices 104, 124 result in cell site areas of services that are of a size that can be considered super cells, the mobile device 116 can be assigned a first mmW BS device for communication over the downlink channel (e.g., mmW BS device 104 communication with the mobile device over downlink channel 118) when the mobile device is located within cell site area of service 110. Then at a later time, when the mobile device 116 is located in the cell site area of service 122, the anchor node 128 can assign the mobile device 116 a different mmW BS device for communication over a different downlink channel (e.g., mmW BS device 124 communication with the mobile device over a downlink channel 402) as the mobile device 116 moves about from location to location. At a first time, the anchor node 128 determines the mobile device 116 is in cell site device area 110 and at a second time, the anchor node 128 determines that the mobile device 116 is in a cell site device area 122.

In some embodiments, the anchor node 128 can assign a downlink channel to the mobile device 116 from either the mmW BS device 104 and/or from the macro cell BS device 112 (if the mobile device is located in overlapping region 126 between two cell site areas for mmW BS device 104 and mmW BS device 124).

Figure 5:
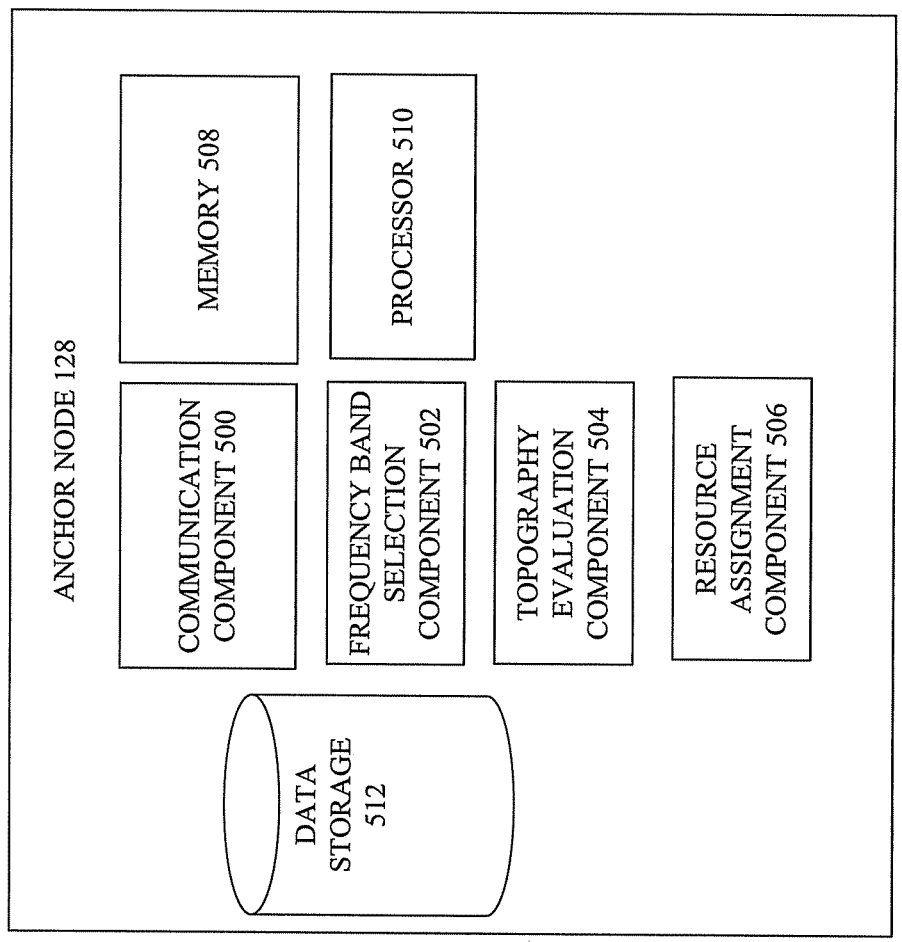
FIG. 5 illustrates an example block diagram of an anchor node employable in the systems of FIGS. 1, 2, 3 and/or 4 to facilitate wireless communication service delivery in accordance with one or more embodiments described herein.

FIG. 5 illustrates an example block diagram of an anchor node employable in the networks of the systems of FIGS. 1, 2, 3 and/or 4 to facilitate wireless communication service delivery in accordance with one or more embodiments described herein. Repetitive description of like elements employed in other embodiments described herein is omitted for sake of brevity.

The anchor node 128 can include communication component 500, frequency band selection component 502, topography evaluation component 504, resource assignment component 506, memory 508, processor 410 and/or data storage 512. In some embodiments, one or more of the communication component 500, frequency band selection component 502, topography evaluation component 504, resource assignment component 506, memory 508, processor 510 and/or data storage 512 can be electrically and/or communicatively coupled to one another to perform one or more functions of anchor node.

The communication component 500 can receive information indicative of a request for service and/or for network access. The information can be received from a mobile device and/or from a component (e.g., BS device) of a network that may be servicing the mobile device and need to handoff service to another component. In some embodiments, the communication component 500 can be configured with one or more different interfaces that can facilitate communication between the anchor node 128 and one or more of the BS devices. For example, over the one or more different interfaces, information can be transmitted and/or received to and/or from one or more different types of BS. Accordingly, in some embodiments, the BS devices can be connected to, or at least communicatively coupled to, the anchor node 128 in order to receive information that informs the BS device of a schedule of a frequency to employ for downlink and/or uplink channel communication.

By way of example, but not limitation, the information transmitted and/or received via the one or more different interfaces can include transmission of scheduling information (e.g., uplink channel assignment, downlink channel assignment), BS selection information (e.g., selection of a particular BS device for downlink channel communication, selection of a particular BS device for uplink channel communication), receipt of BS device resource and/or availability information, or the like.

The topography evaluation component 504 can determine whether line of sight exists between an mmW BS and the mobile device and/or evaluate the topography of the location of the mobile device generally. The resource assignment component 506 can determine which BS s and/or frequencies are available to service the mobile device. The frequency band selection component 502 can determine the frequency band for use by the mobile device for the uplink channel and for the downlink channel. Memory 508 can be a computer-readable storage medium storing computer-executable instructions and/or information configured to perform one or more of the functions described herein with reference to the anchor node 128. The resource information, mobile device identities, topography information can be stored in the data storage 512 and/or otherwise accessible to the anchor node 128 over a network (e.g., Internet). The processor 510 can perform one or more of the functions described herein with reference to the anchor node 128.

The anchor node 128 can evaluate different factors and generate information indicative of one or more transmission parameters (e.g., type of BS device, identity of BS device, frequency band for downlink channel, frequency band for uplink channel, power level for downlink channel, power level for uplink channel) for a type of access to the network device by the mobile device as described herein.

In some embodiments, an anchor node 128 can be provided at one or more (or at each) BS device of the systems of FIGS. 1, 2, 3 and/or 4. In some embodiments, the anchor node 128 can be a core element node, which is included as part of the mobility architecture for the system 100, 200, 300, 400. In this embodiment, the anchor node 128 can provide one or more functions associated with a spectrum and/or resource management.

Figure 6:
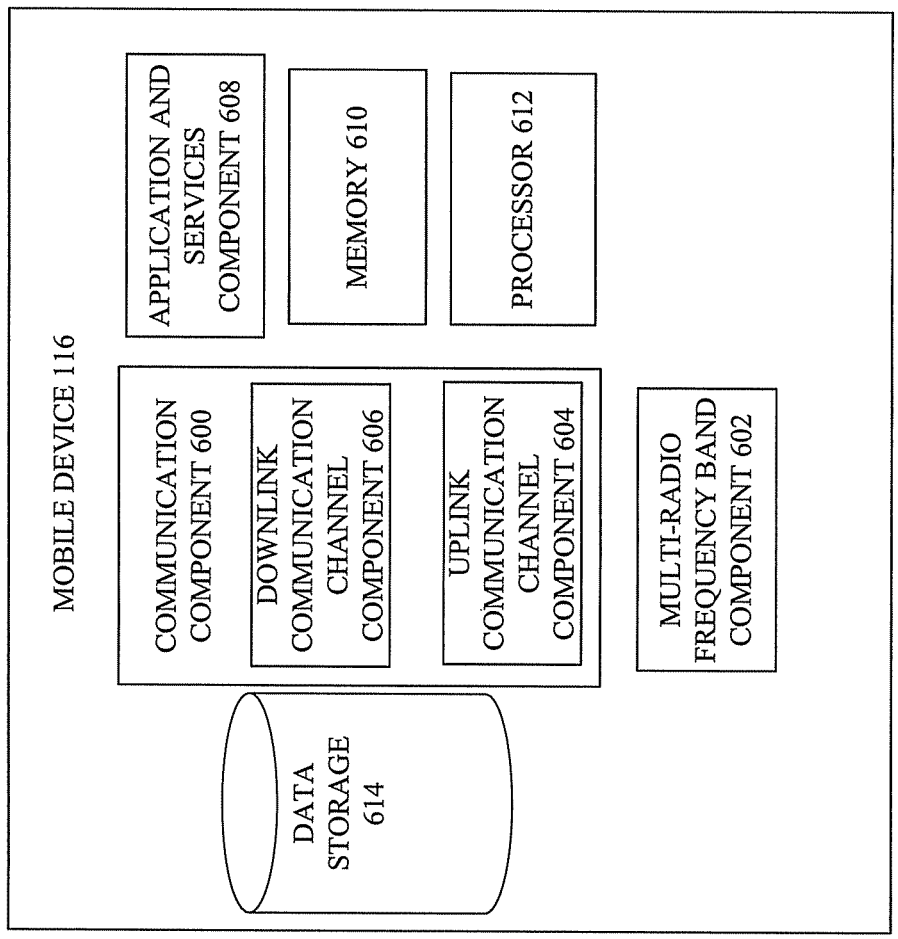
FIG. 6 illustrates an example block diagram of a mobile device for which wireless communication service delivery can be provided in accordance with one or more embodiments described herein.

FIG. 6 illustrates an example block diagram of a mobile device for which wireless communication service delivery can be provided in accordance with one or more embodiments described herein. Repetitive description of like elements employed in other embodiments described herein is omitted for sake of brevity.

The mobile device 116 can include communication component 600, (which can include downlink communication channel component 606 and uplink communication channel component 604), multi-RF band component 602, application and services component 608, memory 610, processor 612 and/or data storage 614. In various embodiments, one or more of communication component 600, (which can include downlink communication channel component 606 and uplink communication channel component 604), multi-RF band component 602, application and services component 608, memory 610, processor 612 and/or data storage 614 can be electrically and/or communicatively coupled to one another to perform one or more functions of mobile device 116.

The communication component 600 can transmit and/or receive information to and/or from mobile device 116. For example, the information can be a request for service and/or access to a network, assignment information from an anchor node regarding one or more resources assigned to the mobile device 116 for uplink channel or downlink channel communication or the like.

The downlink communication channel component 606 can process information received on the downlink (e.g., from the mmW BS device). The uplink communication channel component 604 can process information received on the uplink (e.g., from the mmW BS device). The downlink communication channel component 606 and the uplink communication channel component 604 can be configured to facilitate and/or perform FDD communication for the mobile device 116.

The multi-RF band component 602 can select one or more frequency bands on which to transmit and/or receive information. For example, the multi-RF band component 602 can select a frequency band for downlink channel communication such that information can be received on the downlink channel from an mmW BS device. Application and services component 608 can process and/or execute instructions to perform one or more operations of an application or service requested by or provided to the mobile device 116. Memory 610 can be a computer-readable storage medium storing computer-executable instructions and/or information configured to perform one or more of the functions described herein with reference to the mobile device 116. The processor 612 can perform one or more of the functions described herein with reference to the mobile device 116.

In various embodiments, the mobile device 116 can be or include a smart phone, a laptop, a tablet, a wearable device or any number of different types of devices that can be mobile from time to time. As described, the anchor node can separate the uplink channel from the downlink channel assignment and the mobile device 116 operation, albeit it may have limited battery power, can be facilitated via uplink communication to the local small cell BS device, another mobile device (e.g., a mesh network configuration) and/or to the local macro cell BS device for the uplink communication while also enjoying the benefits of mmW BS device downlink communication channel power and spectrum resources.

Figure 7:
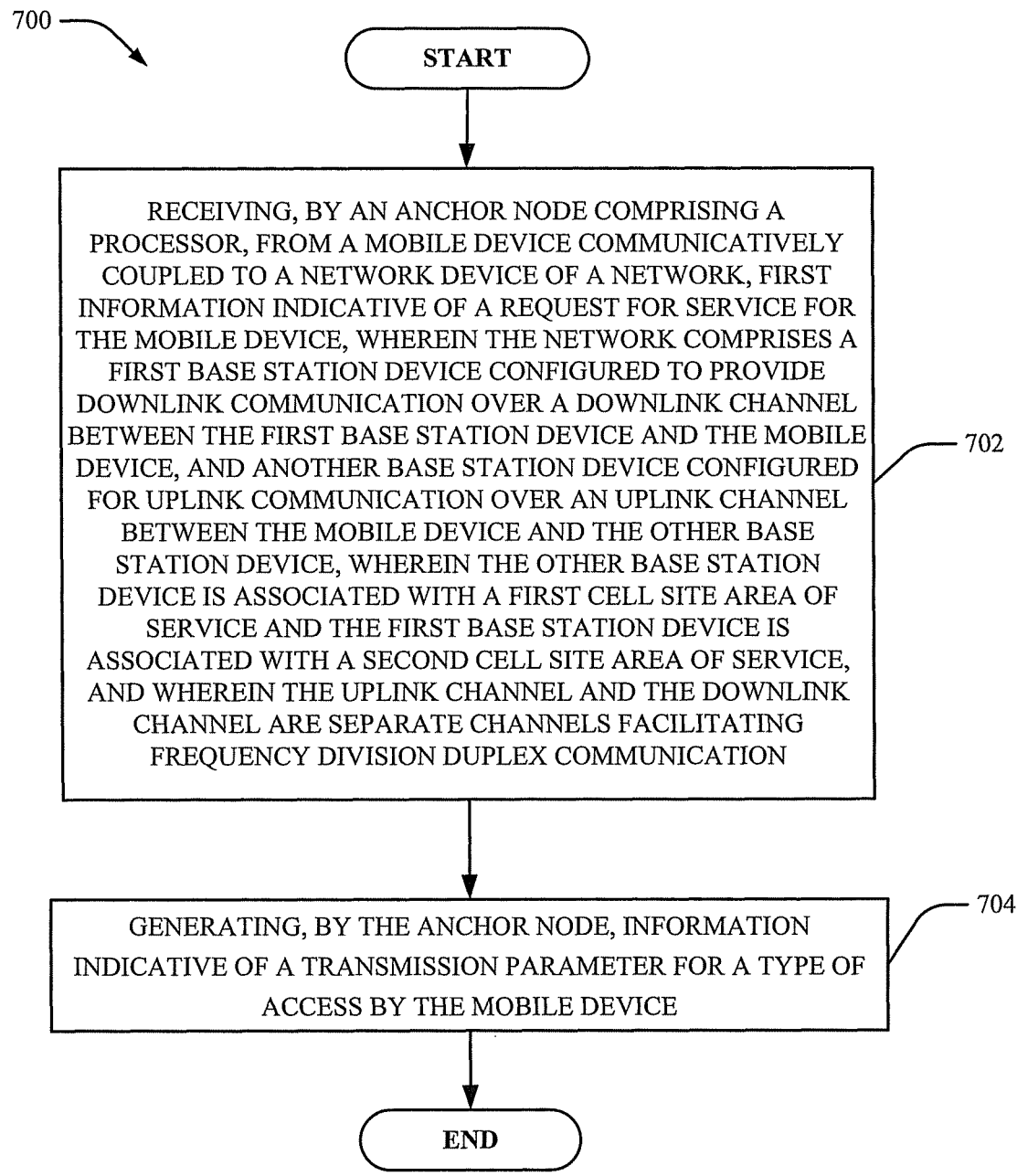
FIGS. 7, 8 and 9 are flowcharts of methods that facilitate wireless communication service delivery in accordance with one or more embodiments described herein.
Figure 8:
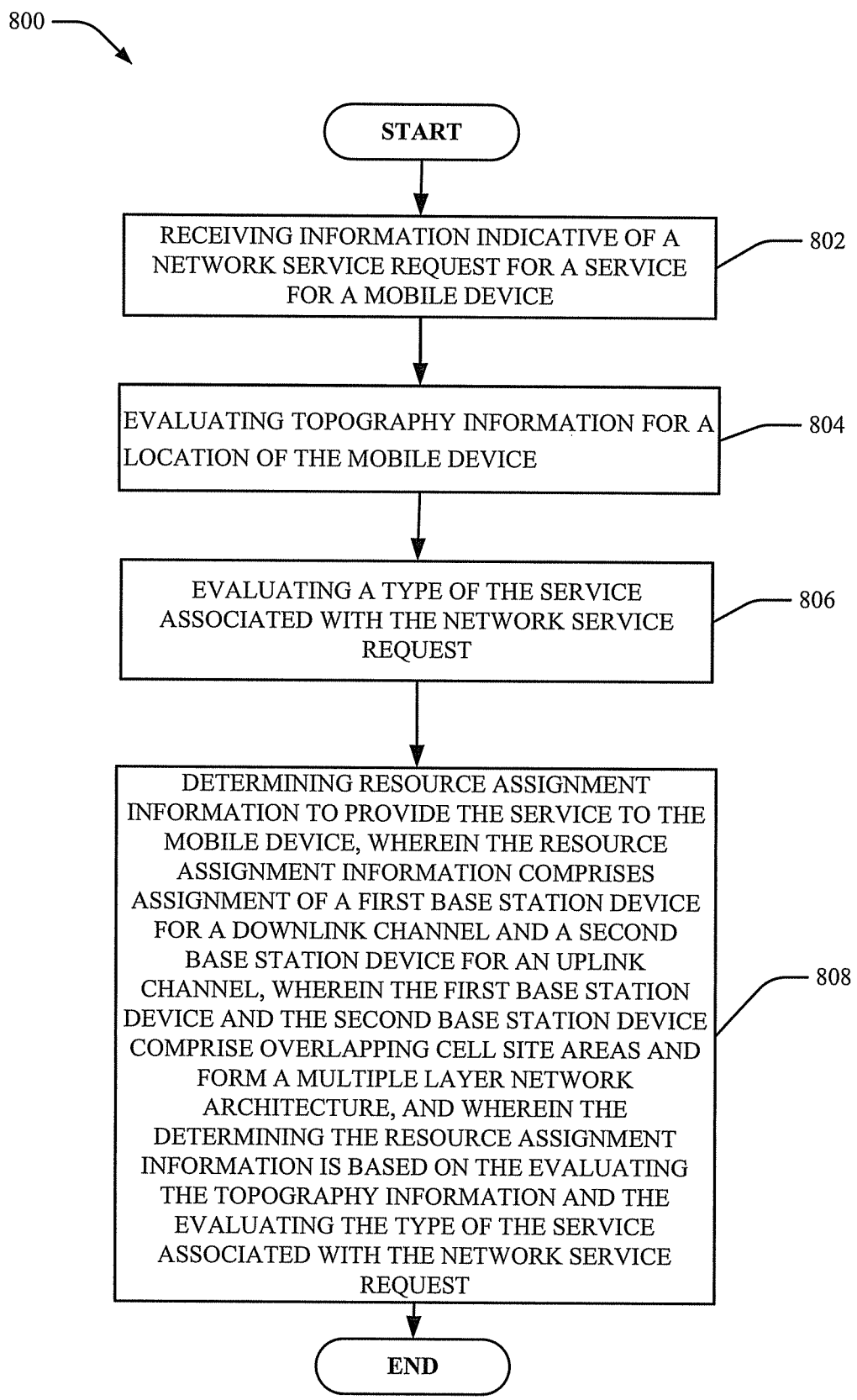
Figure 9:
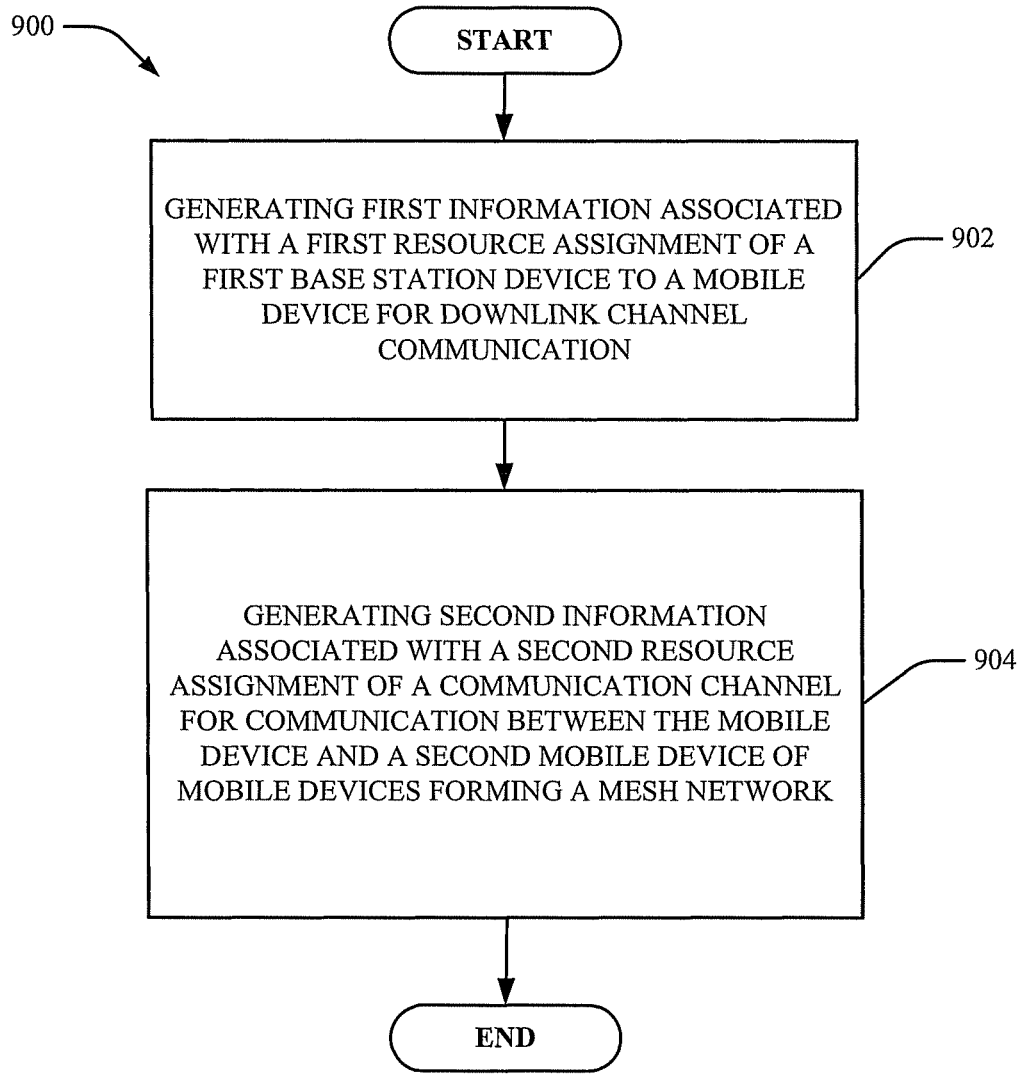

FIGS. 7, 8 and 9 are flowcharts of methods that facilitate wireless communication service delivery in accordance with one or more embodiments described herein. Turning first to FIG. 7, at 702, method 700 can include receiving, by an anchor node comprising a processor, from a mobile device communicatively coupled to a network device of a network, first information indicative of a request for service for the mobile device, wherein the network comprises a first base station device configured to provide downlink communication over a downlink channel between the first base station device and the mobile device, and another base station device configured for uplink communication over an uplink channel between the mobile device and the other base station device, wherein the other base station device is associated with a first cell site area of service and the first base station device is associated with a second cell site area of service, and wherein the uplink channel and the downlink channel are separate channels facilitating frequency division duplex communication. In some embodiments, the first BS device can be a BS device configured to provide mmW communication. In various embodiments, the first BS device can be configured to provide communication over any number of different RF bands.

In some embodiments, at least a first portion of the first cell site area of service and at least a second portion of the second cell site area of service overlap. Accordingly, a multiple layer network architecture exists for facilitating service provisioning for the mobile device. The multiple layer network enables the anchor node to strategically identify BS s and/or one or more frequency bands for assignment to the mobile device for service provisioning.

In some embodiments, the uplink channel associated with the other BS device is provided via a first frequency band and the downlink channel associated with the mmW BS device is provided via a second frequency band, wherein the first frequency band is different from the second frequency band. For example, the first frequency band can be that associated with the macro cell BS communication and the second frequency band can be that associated with an mmW BS communication.

In some embodiments, the downlink channel is associated with a first power level and the uplink channel is associated with a second power level. The first power level can be greater than the second power level, for example. In cases in which the mmW BS device is providing the downlink channel, the increased power level of the downlink channel relative to the power level of the uplink channel can lead to a super cell or other cell site area of service provided by the mmW BS device that is significant in range.

The anchor node can determine whether to assign the mmW BS device based on the presence or absence of line of sight between the mmW BS device and the mobile device in some cases. As such, embodiments described herein can be extended beyond indoor environments to outdoor environments if line of sight is available.

Although one or more embodiments described herein include the mmW BS device providing the downlink channel, such need not be the case and the anchor node can assign other types of BS devices to provide the downlink channel. For example, each of the mmW BS device and the other BS devices in the multiple layer network are configurable to service the mobile device over the downlink channel. As such, while the mmW BS device can be assigned for downlink channel communication, in embodiments in which the environment or services are not amenable to employing the mmW BS device, another type of BS can be employed for the downlink channel. By way of example, but not limitation, in cases in which the services to be provided to the mobile device are tolerant to possible service interruption (e.g., data services), mmW BS devices can provide the downlink channel.

In some embodiments, the BS device assigned by the anchor node is a function of the location of the mobile device within one or more cell site areas of services. For example, in the case in which there are multiple mmW BS devices and the mobile device is located in the overlapping region between the respective cell site areas of service for two or more of the mmW BS devices, the anchor node can assign a nearby macro cell device to provide the downlink channel so as to reduce the likelihood of service interruption that is more likely to occur with a moving device in the overlapping region.

At 704, method 700 can include generating, by the anchor node, information indicative of a transmission parameter for a type of access by the mobile device. In some embodiments, the generating the information comprises: determining that a defined condition is satisfied relative to line of sight communication between the mobile device and the mmW base station, and wherein the transmission parameter is associated with access to the network for provisioning the service. The defined condition can comprise an LOS communication channel being in existence between the mmW BS device and the mobile device, and wherein the transmission parameter assigns the mmW BS device to facilitate the service provisioning of the mobile device based on the defined condition being satisfied.

As described, in one embodiment, the network further comprises a second mmW BS device associated with a third cell site area of service. Although not shown, method 700 can also comprise, prior to the generating, determining a location of the mobile device within the network. Generating the information indicative of the transmission parameter can comprise: generating first information indicative of a first assignment to the mmW BS device for downlink channel communication based on determining that the location is within the second cell site area of service; and generating second information indicative of a second assignment to the second mmW BS device for the downlink channel communication based on determining that the location is within the third cell site area of service.

In some embodiments, an overlapping region exists in an overlap between the second cell site area of service and the third cell site area of service and, as described above, the generating the information further comprises generating third information indicative of a third assignment to the macro cell BS device for the downlink channel communication based on determining that the location is within the overlapping region.

Turning now to FIG. 8, at 802, method 800 can include receiving information indicative of a network service request for a service for a mobile device. At 804, method 800 can include evaluating topography information for a location of the mobile device. At 806, method 800 can include evaluating a type of the service associated with the network service request. For example, the type of service can be the type of service requested for provisioning to the mobile device (e.g., voice, data).

At 808, method 800 can include determining resource assignment information to provide the service to the mobile device, wherein the resource assignment information comprises assignment of a first BS device for a downlink channel and a second BS device for an uplink channel, wherein the first BS device and the second BS device comprise overlapping cell site areas and form a multiple layer network architecture, and wherein the determining the resource assignment information is based on the evaluating the topography information and the evaluating the type of the service associated with the network service request In some embodiments, the first BS device comprises an mmW BS device and the second BS device comprises a small cell BS device. As such, whether line of sight exists between the first BS device and the mobile device can be a determining factor as to the assignment of the mmW BS device. The small BS device can be a femto cell BS device, for example. In some embodiments, the first BS device comprises an mmW BS device and the second BS device comprises a macro cell BS device.

Turning now to FIG. 9, at 902, method 900 can include generating first information associated with a first resource assignment of a first BS device to a mobile device for downlink channel communication. In some embodiments, the first BS device can be a BS device configured to provide mmW communication. In various embodiments, the first BS device can be configured to provide communication over any number of different RF bands.

At 904, method 900 can include generating second information associated with a second resource assignment of a communication channel for communication between the mobile device and a second mobile device of mobile devices forming a mesh network. In this embodiment, a downlink channel is facilitated to the mobile device by the mmW BS device. Upon receiving the communication on the downlink channel, the mobile device can communicate and/or transmit information to another mobile device in a mesh network composed of the mobile device. As such, a peer-to-peer mesh network can be established that can facilitate transfer of information from one mobile device to another mobile device. In one embodiment, the mobile device requesting service can be the device that has the downlink channel with the mmW BS device. In other embodiments, another mobile device in the mesh network can receive communication from the mobile device that has the downlink channel with the mmW BS device. Accordingly, service to a device can be facilitated via direct communication with the mmW BS device or via a mobile device that has a direct communication with the mmW BS device and forwards the information to the mobile device that has requested the service. Any number of permutations for providing services can be provided and are envisaged. Accordingly, in some embodiments, although not shown, the method 900 also includes receiving a request for service from the second mobile device and the generating the first information and the generating the second information are based on the receiving. In other embodiments, the method 900 can include receiving a request for service from the mobile device and the generating the first information and the generating the second information are based on the receiving.

In some embodiments, the downlink channel communication from the mmW base station is via a first frequency band and point-to-point communication is assigned and/or provided via a second frequency band distinct from the first frequency band. The downlink channel can be associated with a first power level and the uplink channel can be associated with a second power level.

Figure 10:
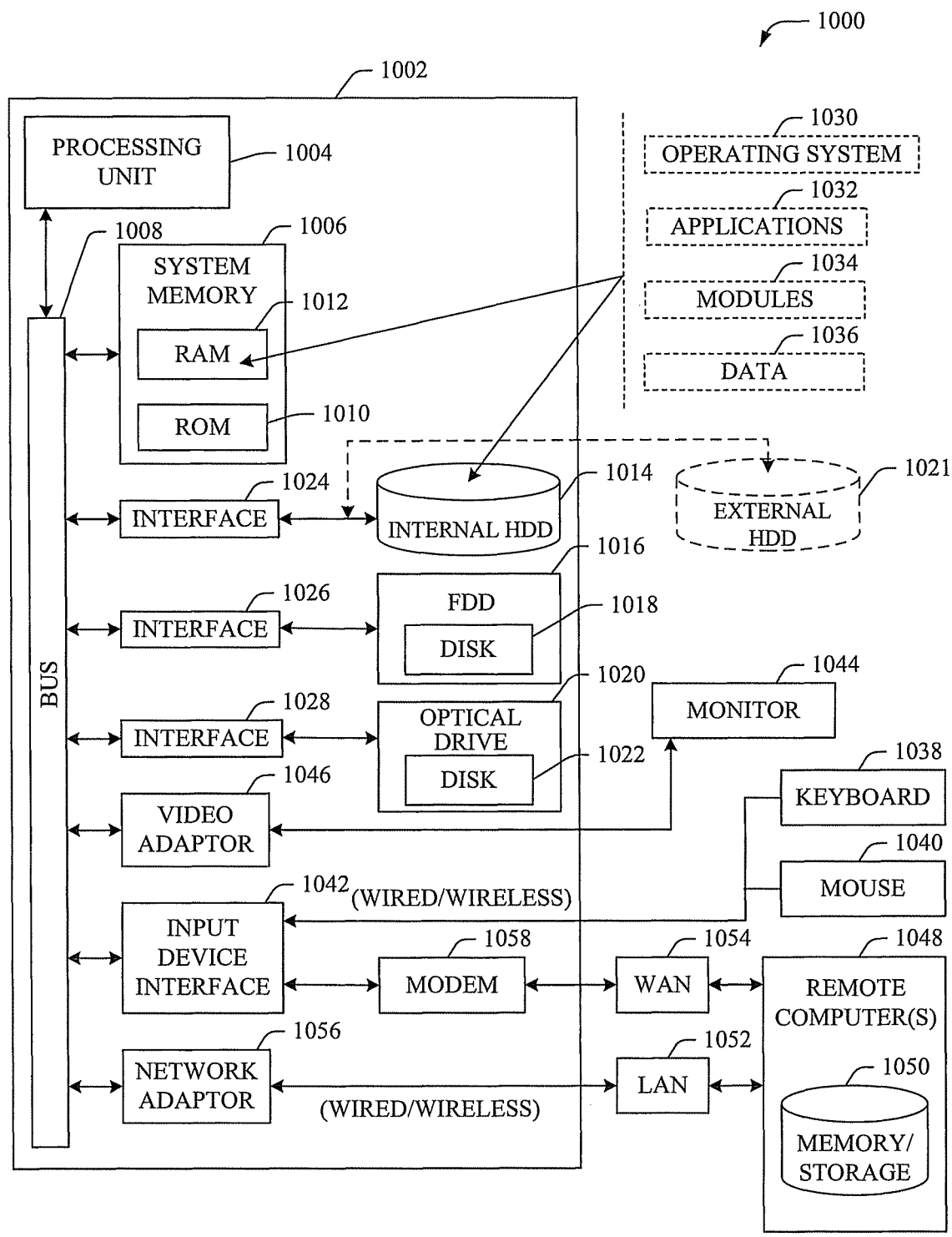
FIG. 10 illustrates a block diagram of a computer that can be employed in accordance with one or more embodiments.

FIG. 10 illustrates a block diagram of a computer that can be employed in accordance with one or more embodiments. Repetitive description of like elements employed in other embodiments described herein is omitted for sake of brevity.

In some embodiments, the computer can be or be included within any number of components described herein comprising, but not limited to, mmW BS devices 104, 124, macro cell BS device 102, 112, mobile devices 116, 300, small cell BS device 106, anchor node 128 (or any components of mmW BS devices 104, 124, macro cell BS device 102, 112, mobile devices 116, 300, small cell BS device 106, anchor node 128).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by an anchor node comprising a processor, from a first mobile device of mobile devices communicatively coupled to a network device of a network, first information indicative of a request for service for the first mobile device, wherein the network comprises a first base station device configured to provide downlink communication over a downlink channel between the first base station device and the first mobile device, and a second base station device configured for broadcast uplink communication over an uplink broadcast channel between a group of the mobile devices and the second base station device, wherein the first base station device is a millimeter wave (mmW) base station device that provides point-to-point communication, wherein the second base station device is associated with a first cell site area of service and the first base station device is associated with a second cell site area of service, and wherein the uplink channel and the downlink channel are separate channels facilitating frequency division duplex communication;
   determining, by the anchor node, that line of sight is present between the mmW base station device and the first mobile device;
   based on the anchor node determining that resources are available from the mmW base station device that has line of sight with the first mobile device, scheduling, by the anchor node, the downlink communication to commence between the mmW base station device and the first mobile device; and
   based on the first information, transmitting, by the anchor node to the first mobile device, an assignment to transmit second information to a second mobile device of the mobile devices via the point-to-point communication, wherein the first mobile device and the second mobile device are included in a mesh network of the mobile devices.

2. The method of claim 1, wherein the uplink channel is one of ones of the uplink channels and wherein the downlink channel is one of ones of the downlink channels, and wherein the method further comprises:
   based on the anchor node determining that a line of sight is not present between the mmW base station device and the first mobile device, and based on the anchor node determining that the first mobile device is in a residential area, scheduling, by the anchor node, the downlink communication to commence between a macro cell base station device and the first mobile device.

3. The method of claim 1, wherein the first base station device and the second base station device are each configurable to service the first mobile device over the downlink channel.

4. The method of claim 1, wherein the first cell site area of service is less than the second cell site area of service.

5. The method of claim 1, wherein the downlink channel is associated with a first power level and the uplink broadcast channel is associated with a second power level, and wherein the first power level is different from the second power level.

6. The method of claim 1, wherein the first base station device is further configured to provide the downlink channel in an outdoor environment between the first base station device and the first mobile device.

7. The method of claim 1, wherein the network further comprises a third base station device that is a same type as the first base station device and is associated with a third cell site area of service, the method further comprising determining a location of the first mobile device within the network, the method further comprising generating information indicative of a transmission parameter comprises:
   generating first assignment information indicative of a first assignment to the first base station device for downlink channel communication based on determining that the location is within the second cell site area of service; and
   generating second assignment information indicative of a second assignment to the third base station device for the downlink channel communication based on determining that the location is within the third cell site area of service.

8. The method of claim 7, wherein an overlapping region exists in an overlap between the second cell site area of service and the third cell site area of service and wherein the generating the information further comprises generating third information indicative of a third assignment to the third base station device for the downlink channel communication based on determining that the location is within the overlapping region.

9. The method of claim 1, further comprising:
   generating, by the anchor node, information indicative of a transmission parameter.

10. The method of claim 9, wherein the transmission parameter is evaluated to determine whether to provide a type of access by the first mobile device, wherein the generating results in an increase in network capacity based on dynamic pairing of ones of downlink channels with ones of uplink channels, and wherein the dynamic pairing is performed without increasing radio frequency spectrum allocation for the network.

11. An apparatus, comprising:
    a processor; and
    a memory that stores executable instructions that, when executed by the processor, facilitate performance of operations, comprising:
    receiving from a first mobile device communicatively coupled to a network device of a network, first information indicative of a request for service for the first mobile device, wherein the network comprises a first base station device configured to provide downlink communication via a downlink channel between the first base station device and the first mobile device, and a second base station device configured for uplink communication via an uplink channel between the first mobile device and the second base station device, wherein the second base station device is associated with a first cell site area of service and the first base station device is associated with a second cell site area of service, wherein the uplink channel and the downlink channel are separate channels facilitating frequency division duplex communication, wherein the first base station device comprises a millimeter wave base station device and wherein the second base station device comprises a macro cell base station device, and wherein coverage of the first cell site area of service is directionally based on orthogonal frequency division multiple access beamforming that is configured to adjust to target communications at a selected one of the mobile devices to provide special access for an instantaneous defined high rate data delivery to the selected one of the mobile devices for special spot delivery;

determining that there is line of sight between the mmW base station device and the first mobile device;

based on determining that there are resources available by the mmW base station device that has line of sight with the first mobile device, and based on determining that the first mobile device is outside of a residential area and traversing a road, scheduling a transmission of the downlink communication between the mmW base station device and the first mobile device; and based on the first information, transmitting, to the first mobile device, an assignment to transmit second information to a second mobile device of the mobile devices via the point-to-point communication, wherein the first mobile device and the second mobile device are included in a mesh network of the mobile devices.

12. The apparatus of claim 11, wherein the uplink channel is one of ones of the uplink channels, and wherein the downlink channel is one of the ones of downlink channels.

13. The apparatus of claim 11, wherein the first cell site area of service is less than the second cell site area of service.

14. The apparatus of claim 11, wherein the downlink channel is associated with a first signal power level and the uplink channel is associated with a second signal power level.

15. The apparatus of claim 14, wherein the first signal power level is different from the second signal power level.

16. The apparatus of claim 11, wherein the operations further comprise:

generating information indicative of a transmission parameter.

17. The apparatus of claim 16, wherein the transmission parameter is evaluated to determine whether to provide a type of access by the first mobile device.

18. The apparatus of claim 17, wherein the generating results in an increase in network capacity based on a pairing of ones of downlink channels with ones of uplink channels, and wherein the pairing is performed without increasing radio frequency spectrum allocation for the network.

19. A non-transitory machine-readable storage medium, comprising executable instructions that, when executed by a processor, facilitate performance of operations, comprising:

receiving, by an anchor node comprising the processor, from a first mobile device communicatively coupled to a network device of a network, first information indicative of a request for service for the first mobile device, wherein the network comprises a first base station device configured to provide downlink communication over a downlink channel between the first base station device and the first mobile device, and a second base station device configured for uplink communication over an uplink channel between the first mobile device and the second base station device, wherein the second base station device is associated with a first cell site area of service and the first base station device is associated with a second cell site area of service, and wherein the uplink channel and the downlink channel are separate channels facilitating frequency division duplex communication;

determining, by the anchor node, whether there is line of sight between a millimeter wave (mmW) base station device and the first mobile device;

based on a result of the determining indicating that line of sight exists between the mmW base station device and the first mobile device and further based on resources of the mmW base station device, which has line of sight with the first mobile device, and further based on identifying a defined type of topography of a location of the first mobile device, being determined to be available, and determining that a service requested by the first mobile device is tolerant of service interruption, scheduling, by the anchor node, the downlink communication between the mmW base station device and the first mobile device; and based on a result of determining that the service requested by the first mobile device fails to be tolerant of the service interruption, scheduling, by the anchor node, the downlink communication channel between a macro cell base station device and the first mobile device.

20. The non-transitory machine-readable storage medium of claim 19, wherein the uplink channel is one of ones of the uplink channels and wherein the downlink channel is one of ones of the downlink channels.

* * * * *